(12) United States Patent
Liu et al.

(10) Patent No.: US 11,508,153 B2
(45) Date of Patent: Nov. 22, 2022

(54) METHOD FOR GENERATING TAG OF VIDEO, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventors: Chengxiang Liu, Beijing (CN); Hao Liu, Beijing (CN); Bolei He, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 232 days.

(21) Appl. No.: 17/115,263

(22) Filed: Dec. 8, 2020

(65) Prior Publication Data
US 2021/0383121 A1    Dec. 9, 2021

(30) Foreign Application Priority Data
Jun. 3, 2020   (CN) .......................... 202010493783.7

(51) Int. Cl.
*G06V 20/40* (2022.01)
*G06K 9/62* (2022.01)
(Continued)

(52) U.S. Cl.
CPC .......... *G06V 20/41* (2022.01); *G06K 9/6267* (2013.01); *G06V 30/274* (2022.01); *G06V 40/16* (2022.01)

(58) Field of Classification Search
CPC ...... G06V 20/41; G06V 40/16; G06V 30/274; G06K 9/6267
See application file for complete search history.

(56) References Cited

U.S. PATENT DOCUMENTS

| | | | |
|---|---|---|---|
| 8,098,976 B1 * | 1/2012 | Acharya | H04N 21/4756 386/278 |
| 2013/0142418 A1 * | 6/2013 | van Zwol | G06V 20/47 382/159 |

(Continued)

FOREIGN PATENT DOCUMENTS

| | | |
|---|---|---|
| CN | 108829893 A | 11/2018 |
| CN | 110287375 A | 9/2019 |

(Continued)

OTHER PUBLICATIONS

Belém, Fabiano Muniz, et al. "Exploiting co-occurrence and information quality metrics to recommend tags in web 2.0 applications." Proceedings of the 19th ACM international conference on Information and knowledge management. 2010. (Year: 2010).*

(Continued)

*Primary Examiner* — Utpal D Shah
(74) *Attorney, Agent, or Firm* — Bridgeway IP Law Group, PLLC; Jihun Kim

(57) ABSTRACT

A method for generating a tag of a video, an electronic device, and a storage medium are related to a field of natural language processing and deep learning technologies. The detailed implementing solution includes: obtaining multiple candidate tags and video information of the video; determining first correlation information between the video information and each of the multiple candidate tags; sorting the multiple candidate tags based on the first correlation information to obtain a sort result; and generating the tag of the video based on the sort result.

20 Claims, 5 Drawing Sheets

(51) Int. Cl.
G06V 30/262 (2022.01)
G06V 40/16 (2022.01)

(56) References Cited

U.S. PATENT DOCUMENTS

| | | | |
|---|---|---|---|
| 2018/0249193 A1* | 8/2018 | Zhang | H04N 21/26603 |
| 2019/0294878 A1* | 9/2019 | Endras | G06T 7/0002 |
| 2021/0201038 A1* | 7/2021 | Xia | G06K 9/6253 |

FOREIGN PATENT DOCUMENTS

| | | | |
|---|---|---|---|
| CN | 111125435 A | | 5/2020 |
| JP | 2008268985 A | | 11/2008 |
| JP | 2018169697 A | | 11/2018 |
| WO | WO-2022070908 A1 | * | 4/2022 |

OTHER PUBLICATIONS

Wang, Changhu, et al. "Image annotation refinement using random walk with restarts." Proceedings of the 14th ACM international conference on Multimedia. 2006. (Year: 2006).*
Shinji Komiya, "Office Action for JP application No. 2020-213352", dated Feb. 8, 2022, JPO, Japan.
Alexandros Bouganis, "Search report for EP application No. 21150149.9", dated Jun. 15, 2021, EPO, Germany.

* cited by examiner

METHOD FOR GENERATING TAG OF VIDEO, ELECTRONIC DEVICE, AND STORAGE MEDIUM

CROSS-REFERENCE TO RELATED APPLICATION

This application claims priority to and benefits of Chinese Patent Application Serial No. 202010493783.7, filed the State Intellectual Property Office of P. R. China on Jun. 3, 2020, the entire content of which is incorporated herein by reference.

FIELD

The present disclosure relates to a field of computer technologies, particularly to a field of natural language processing and deep learning technologies, and more particularly to a method for generating a tag of a video, an electronic device, and a storage medium.

BACKGROUND

Personalized information recommendation based on interest points of a user is a new trend of information consumption, such as recommendation of a video resource. To achieve personalized recommendation of the video resource, the video resource generally needs to be labeled with a tag, and then video recommendation is performed based on the tag of the video.

Therefore, how to obtain a high-precision tag of the video plays a key role in the video recommendation.

SUMMARY

According to embodiments of the present disclosure, a method for generating a tag of a video is provided. The method includes: obtaining multiple candidate tags of the video; obtaining video information of the video; determining first correlation information between the video information and each of the multiple f candidate tags; sorting the multiple candidate tags based on the first correlation information to obtain a sort result; and generating the tag of the video based on the sort result.

According to embodiments of the present disclosure, an electronic device is provided. The electronic device includes: at least one processor and a memory. The memory is communicatively coupled to the at least one processor. The memory is configured to store instructions executed by the at least one processor. When the instructions are executed by the at least one processor, the at least one processor is caused to execute the method for generating the tag of the video according to the above embodiments.

According to embodiments of the present disclosure, a non-transitory computer readable storage medium is provided. The non-transitory computer readable storage medium has computer instructions stored thereon. The computer instructions are configured to enable a computer to execute the method for generating the tag of the video according to the above embodiments.

Other effects of the above alternative embodiments will be explained in the following with specific embodiments.

BRIEF DESCRIPTION OF THE DRAWINGS

The accompanying drawings are used for better understanding the solution and do not constitute a limitation of the present disclosure.

DETAILED DESCRIPTION

Description will be made below to exemplary embodiments of the present disclosure with reference to accompanying drawings, which includes various details of embodiments of the present disclosure to facilitate understanding and should be regarded as merely examples. Therefore, it should be recognized by the skilled in the art that various changes and modifications may be made to the embodiments described herein without departing from the scope and spirit of the present disclosure. Meanwhile, for clarity and conciseness, descriptions for well-known functions and structures are omitted in the following description.

Description will be made below to a method and an apparatus for generating a tag of a video, an electronic device, and a storage medium according to embodiments of the present disclosure with reference to accompanying drawings.

With the method for generating a tag of a video according to embodiments of the present disclosure, multiple candidate tags are sorted based on correlation information between video information and each of the multiple candidate tags to generate a sort result, and a tag of the video is generated based on the sort result. In this way, integration and utilization of the multiple candidate tags is implemented. The video is labeled accurately and perfectly. An accuracy and an integrity of the tag of the video are improved. An effect of video recommendation is improved.

Figure 1:
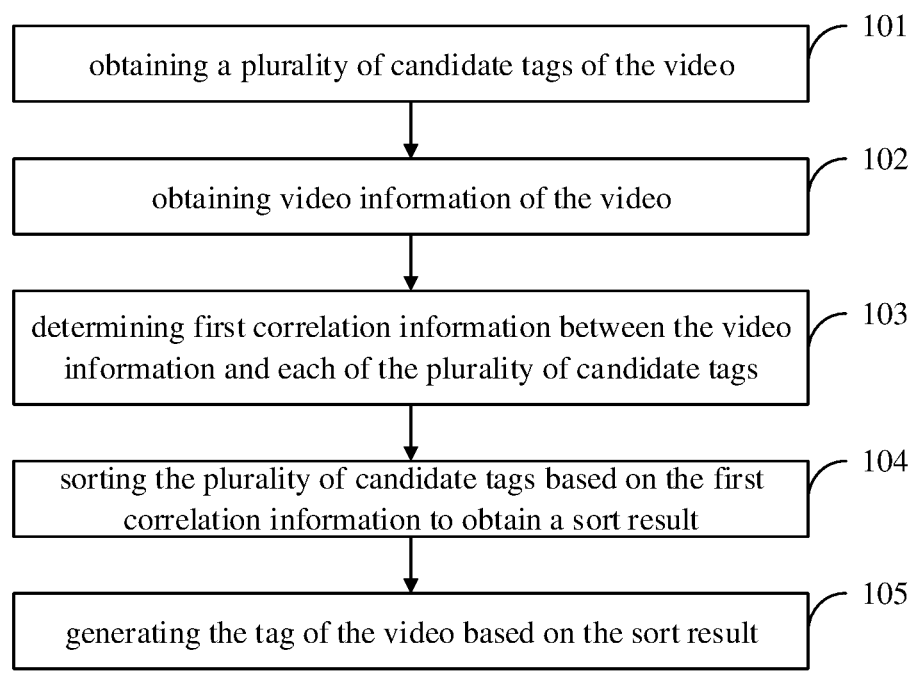
FIG. 1 is a flow chart illustrating a method for generating a tag of a video according to an embodiment of the present disclosure.

FIG. 1 is a flow chart illustrating a method for generating a tag of a video according to an embodiment of the present disclosure.

The method for generating a tag of a video according to embodiments of the present disclosure may be executed by an apparatus for generating a tag of a video according to embodiments of the present disclosure. The apparatus be configured in an electronic device to generate an accurate and complete tag of the video based on correlations between video information and the multiple candidate tags.

As illustrated in FIG. 1, the method for generating a tag of a video includes the followings.

At block 101, multiple candidate tags of the video are obtained.

In an embodiment of the present disclosure, the multiple candidate tags of the video may be obtained based on related information of the video. For example, the related information of the video may be a title of the video, a user tag and other information. The user tag refers to a tag edited by a user when the video is uploaded.

For example, when a publisher of a certain video uploads a video, the publisher edits tags "Delicacy" and "Dessert", then "Delicacy" and "Dessert" may be taken as candidate tags of the video.

At block 102, video information of the video is obtained.

In an embodiment of the present disclosure, the video information may refer to content information of the video. In a practical application, the closer the tag of the video is to the content information of the video, the more accurate the tag of the video is. Therefore, the video information of the video, such as character information and a building name in the video, may be obtained.

At block 103, first correlation information between the video information and each of the multiple candidate tags is determined.

In an embodiment of the present disclosure, correlation information between the video information and each candidate tag may be determined, which is referred as the first correlation information for convenience of distinguishing.

In detail, a vector representation corresponding to the video information and a vector representation corresponding to each candidate tag are obtained. Then a matching degree between the video information and each candidate tag is calculated based on the vector representation corresponding to the video information and the vector representation corresponding to each candidate tag. The first correlation information is determined based on the matching degree. The higher the matching degree, the greater a correlation is. Therefore, the first correlation information between each candidate tag and the video information may be obtained.

At block 104, the multiple candidate tags are sorted based on the first correlation information to obtain a sort result.

After the first correlation information between each candidate tag and the video information is obtained, the multiple candidate tags are sorted based on the first correlation information corresponding to each candidate tag. For example, the first correlation information corresponding to respective candidate tags is sorted based on a descending order of the correlations. The first correlation information corresponding to respective candidate tags may also be sorted based on an ascending order of the correlations.

At block 105, the tag of the video is generated based on the sort result.

Since some of the multiple candidate tags may have a low correlation to the video information, a preset number of candidate tags with higher correlations to the video information may be obtained from the multiple candidate tags in an embodiment of the present disclosure. The preset number of candidate tags with the higher correlations may be used as the tags of the video. Therefore, the candidate tags with the low correlations to the video information may be screened out, thereby improving the accuracy of the tag of the video.

In a practical application, it is difficult for a single tag to represent video content, and the single tag also has noise sometimes. For example, a tag may be uncorrelated to the video content. However, in this embodiment, the multiple candidate tags are integrated and utilized to obtain the tag of the video, thereby improving the integrity of the tag of the video.

In some embodiments of the present disclosure, the multiple candidate tags and the video information are obtained, the first correlation information between the video information and each of the multiple candidate tags is determined, the multiple candidate tags are sorted based on the first correlation information to obtain the sort result, and the tag of the video is generated based on the sort result. In this way, the multiple candidate tags are sorted based on the correlation information between the video information and each candidate tag, and the tag of the video is generated based on the sort result, thereby implementing the integration and utilization of the multiple candidate tags, labeling the video accurately and perfectly, improving the accuracy and integrity of the tag of the video, and improving the effect of the video recommendation.

Figure 2:
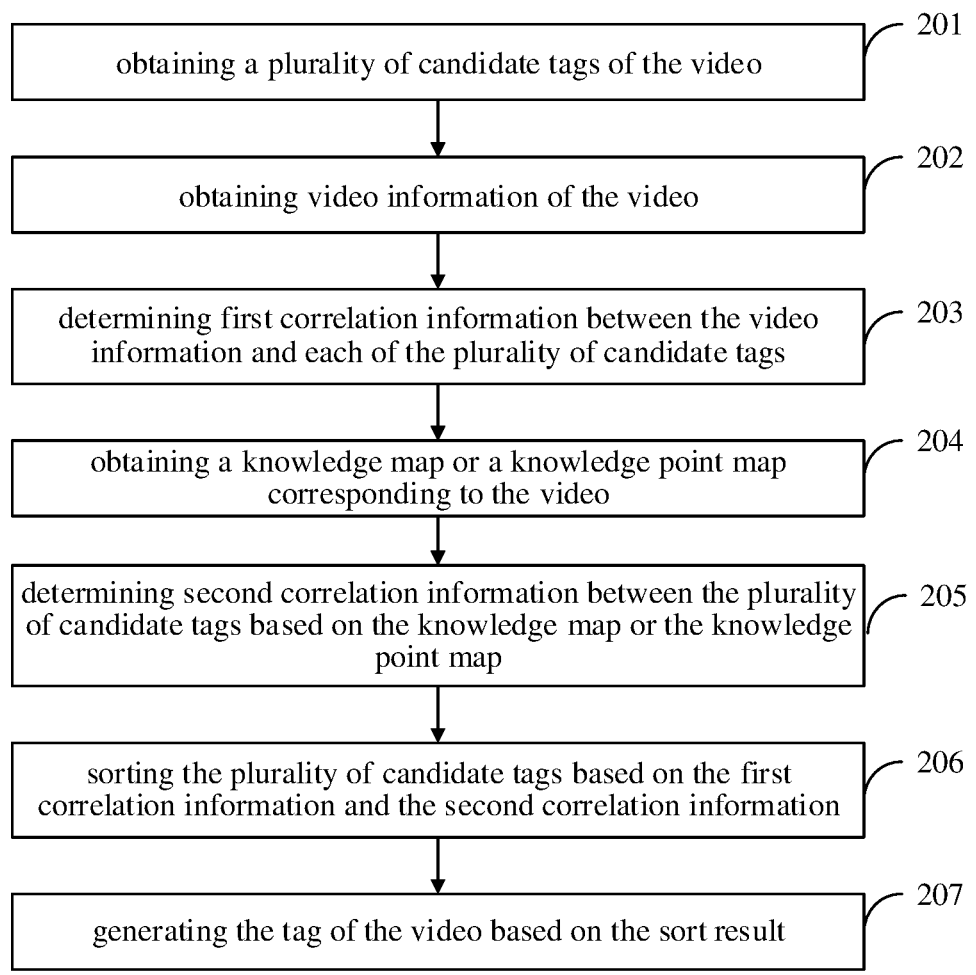
FIG. 2 is a flow chart illustrating a method for generating a tag of a video according to another embodiment of the present disclosure.

For further improving the accuracy and the integrity of the tag of the video, in an embodiment of the present disclosure, second correlation information between the multiple candidate tags may also be determined based on a knowledge map or a knowledge point map, and the tag of the video is generated in combination with the first correlation information and the second correlation information. Description will be made below with reference to FIG. 2. FIG. 2 is a flow chart illustrating a method for generating a tag of a video according to another embodiment of the present disclosure.

At block 201, multiple candidate tags of the video are obtained.

At block 202, video information of the video is obtained.

At block 203, first correlation information between the video information and each of the multiple candidate tags is calculated.

In this embodiment, the actions at blocks 201-203 are similar to the actions at blocks 101-103, which is not elaborated herein.

At block 204, a knowledge map or a knowledge point map corresponding to the video is obtained.

In an embodiment of the present disclosure, the knowledge map is pre-established. The knowledge map may be obtained based on names of the video or characters in the video. For example, if the video is a segment of a teleplay, correlation information of the teleplay may be queried from the Internet, such as a director, roles, a character relationship in the teleplay, and an actor of each role. The correlation information of the teleplay may be viewed as the knowledge map.

The knowledge point map includes entities and correlations between the entities. The correlations between the entities may be calculated based on a co-occurrence situation.

At block 205, second correlation information between the multiple candidate tags is determined based on the knowledge map or the knowledge point map.

In an embodiment of the present disclosure, correlation information between the multiple candidate tags, which is referred as the second correlation information, may be determined based on correlations between entities in the knowledge map.

For example, candidate tags of a certain video are a role A and a teleplay name B, and the role A is played by an actor C in a knowledge map corresponding to the video. A correlation between the role A and the actor C and a correlation between the actor C and the teleplay name B may be determined.

Since the knowledge point map includes the correlations between the entities, the correlation information between the multiple candidate tags may be obtained based on the knowledge point map. For example, a correlation between an actor and a teleplay played by the actor may be obtained from the knowledge point map.

In this embodiment, based on the knowledge map or the knowledge point map, not only the correlation information between the multiple candidate tags may be obtained, but also the candidate tags may be expanded to enrich the candidate tags.

At block 206, the multiple candidate tags are sorted based on the first correlation information and the second correlation information.

When the multiple candidate tags are sorted based on the first correlation information and the second correlation information, the multiple candidate tags may be sorted firstly based on the first correlation information corresponding to each candidate tag to obtain an initial sort result. Then, positions of the multiple candidate tags in the initial sort result are adjusted based on the second correlation information, such that the candidate tags with higher correlations are adjacent to each other, to obtain a final sort result.

Alternatively, a candidate tag with a maximum correlation to the video information is determined. Then remaining candidate tags are sorted based on an average value of a first correlation and a second correlation corresponding to each remaining candidate tag. The first correlation is a correlation between each remaining candidate tag and the candidate tag with the maximum correlation, and the second correlation is a correlation between each remaining candidate tag and the video information.

The above two ways are only examples. Other ways for sorting the candidate tags based on the first correlation information and the second correlation information also belong to the protection scope of the present disclosure.

At block 207, the tag of the video is generated based on the sort result.

In this embodiment, the action at block 207 is similar to the action at block 105, which is not elaborated here.

It should be noted that, in some embodiments of the present disclosure, the action at block 204 may also be executed before the action at block 203. The execution order of the actions at blocks 201, 202 and 204 is not limited. The execution order of the actions at blocks 205 and 203 is not limited.

In an embodiment of the present disclosure, the knowledge map or the knowledge point map corresponding to the video may also be obtained. The second correlation information between the multiple candidate tags is determined based on the knowledge map or the knowledge point map. The multiple candidate tags are sorted based on the first correlation information and the second correlation information. In this way, by utilizing the correlation information between each of the multiple candidate tags and the video information and the correlation information between the multiple candidate tags to sort the multiple candidate tags, the accuracy of sorting is improved. By generating the tag of the video based on the sort result, the accuracy and the integrity of the tag of the video is further improved.

In a practical application, the video generally has a title. In an embodiment of the present disclosure, when the multiple candidate tags of the video are obtained, the title of the video may be obtained first, and then the multiple candidate tags may be generated based on the title of the video.

In detail, word segmentation processing is performed on the title of the video to obtain word segmentations of the title of the video. One or more keywords are extracted from the word segmentations. The extracted one or more keywords are taken as the candidate tags.

In some embodiments of the present disclosure, when the multiple candidate tags of the video are obtained, the title of the video is obtained, and the multiple candidate tags are generated based on the title of the video. In this way, by generating the multiple candidate tags based on the title of the video, the candidate tags of the video are enriched.

In an embodiment of the present disclosure, when the multiple candidate tags of the video are obtained, an author tag of the video may be obtained, and the multiple candidate tags may be generated based on the author tag. In detail, after the author tag is obtained, the obtained author tag may be used as a candidate tag of the video.

The author tag refers to a tag edited by an author of the video when the video is published.

In some embodiments of the present disclosure, when the multiple candidate tags of the video are obtained, the author tag of the video may be obtained, and the multiple candidate tags may be generated based on the author tag. In this way, by generating the candidate tags based on the author tag of the video, the candidate tags of the video are also enriched.

In an embodiment of the present disclosure, when the multiple candidate tags of the video are obtained, classification information of the video may be obtained, and the multiple candidate tags may be generated based on the classification information.

In an embodiment of the present disclosure, the classification information of the video refers to a classification to which the video belongs, such as entertainment, funny, and science and technology. The classification information may be a classification input by an author of the video when the video is published, or may be obtained from the knowledge map, or may be classification information determined based on an existing video classification method.

After the classification information is obtained, the classification to which the video belongs may be taken as a candidate tag of the video. For example, when a certain video is a segment of a teleplay and a classification of the teleplay is a costume drama, then the term "costume" may be taken as a candidate tag of the video.

In an embodiment of the present disclosure, when the multiple candidate tags of the video are obtained, the classification information of the video may be obtained, and the multiple candidate tags may be generated based on the classification information. In this way, by generating the multiple candidate tags based on the classification information of the video, the candidate tags of the video are enriched.

In order to generate a tag of the video with a high accuracy, in an embodiment of the present disclosure, when the multiple candidate tags of the video are obtained, text information in the video may be recognized, and the multiple candidate tags may be generated based on the text information.

When the text information is obtained, if the video has subtitles, the subtitles obtained from the video may be regarded as the text information. Alternatively, audio information in the video may be collected, and the audio information is recognized to obtain corresponding text information.

After the text information is obtained, keywords may be extracted from the text information, and the extracted keywords may be used as the candidate tags of the video. For example, a preset number of words with high occurrence times are extracted from the video as the candidate tags of the video.

In some embodiments of the present disclosure, when the multiple candidate tags of the video are obtained, the text information in the video may be recognized, and the multiple candidate tags may be generated based on the text information. Since the multiple candidate tags are generated based on the text information in the video, not only the candidate tags of the video are enriched, but also there is a high correlation between each candidate tag and the video.

Figure 3:
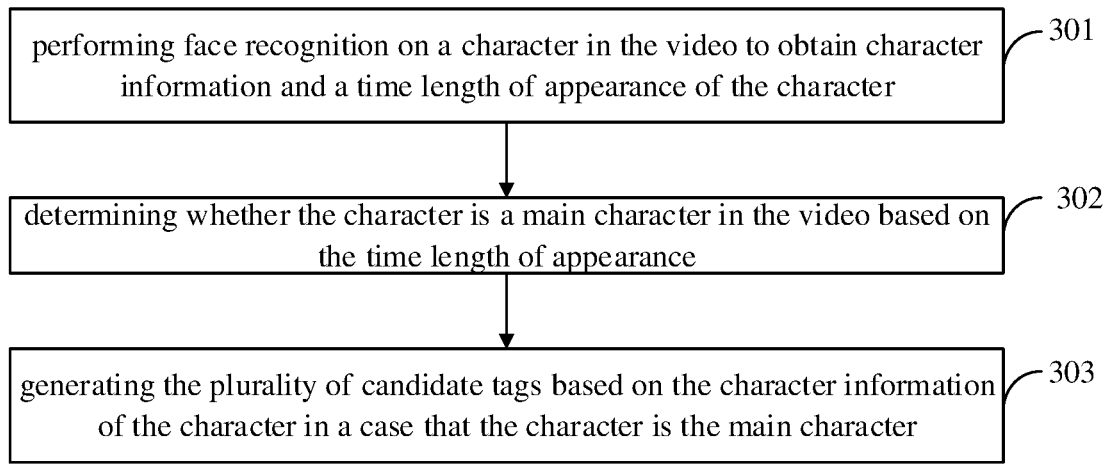
FIG. 3 is a flow chart illustrating a method for generating a tag of a video according to another embodiment of the present disclosure.

In an embodiment of the present disclosure, in order to enrich the candidate tags of the video, the candidate tags of the video may also be obtained based on a main character in the video. Description will be made below in combination with FIG. 3. FIG. 3 is a flow chart illustrating a method for generating a tag of a video according to another embodiment of the present disclosure.

As illustrated in FIG. 3, obtaining the multiple candidate tags of the video includes the followings.

At block 301, face recognition is performed on a character in the video to obtain character information and a time length of appearance of the character.

In this embodiment, the face recognition may be performed on each image frame in the video. The image frames containing the same character in all image frames are counted. The character information and the time length of appearance of each character are obtained.

The character information may be a name of a character in the video. The time length of appearance of the character may refer to a time period during which the character appears in the video.

At block 302, it is determined whether the character is a main character in the video based on the time length of appearance.

In a practical application, the main character generally appears for a long time in the video. Therefore, in this embodiment, the time length of appearance of the character may be counted based on appearance time periods, and it may be determined whether the character is the main character in the video based on the time length of appearance of each character.

In detail, it may be determined whether a ratio of the time length of appearance of the character to a duration of the video is larger than a preset ratio. When the ratio of the time length of appearance of the character to the duration of the video is larger than the preset ratio, the character may be considered as the main character in the video.

At block 303, the multiple candidate tags are generated based on the character information of the character in a case that the character is the main character.

In an embodiment of the present disclosure, when the character is the main character, the candidate tags are generated based on the character information of the character, such as the name of the character.

Alternatively, a preset number of characters with the long time length of appearance in the video are taken as the main characters in the video, and then the candidate tags are generated based on the character information of the main characters.

In some embodiments of the present disclosure, when the multiple candidate tags of the video are obtained, the face recognition is performed on the character in the video to obtain the character information and the time length of appearance of the character. It is determined whether the character is the main character in the video based on the time length of appearance. The multiple candidate tags are generated based on the character information of the character in the case that the character is the main character. In this way, it is determined whether the character is the main character based on the time length of appearance of the character in the video, and the candidate tags are generated based on the character information of the main character if the character is the main character. Since the main character is recognized from the video, the generated candidate tags are not only related to the video, but also enrich the candidate tags of the video.

The above describes several methods for obtaining the candidate tags of the video from different sources. Therefore, when the tag of the video is generated, the multiple candidate tags from different sources may be obtained, and the tag of the video may be generated based on the correlations between the multiple candidate tags and the video information. The candidate tags from different sources are integrated and utilized to generate the tag of the video, thereby improving the accuracy and integrity of the tag of the video.

Figure 4:
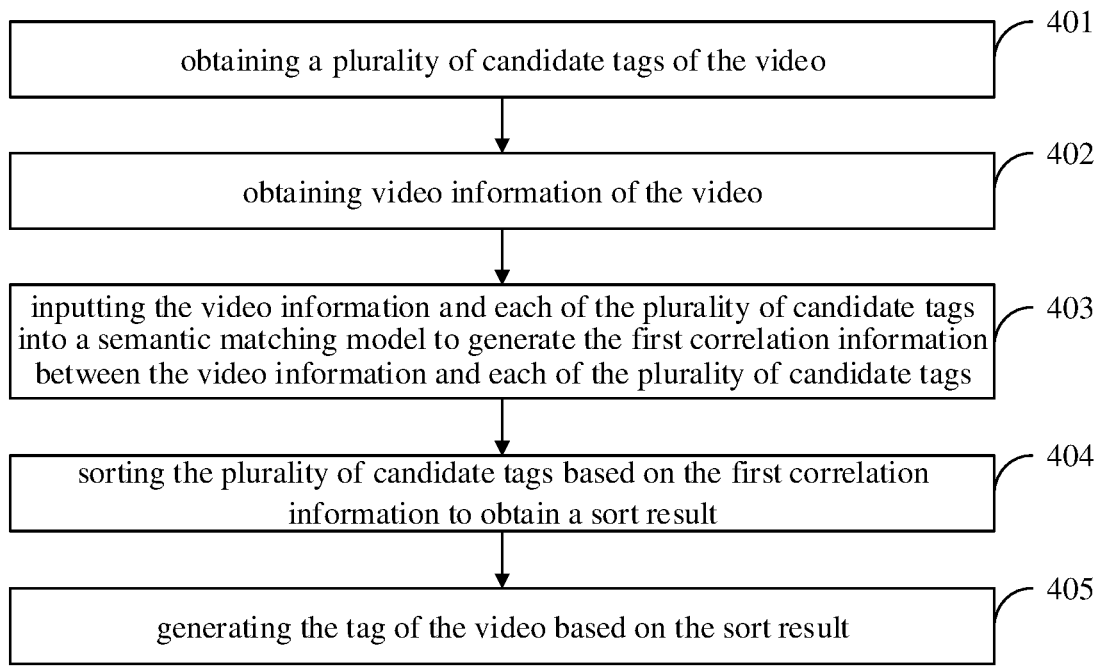
FIG. 4 is a flow chart illustrating a method for generating a tag of a video according to another embodiment of the present disclosure.

In an embodiment of the present disclosure, in order to improve the accuracy of the correlation between the video information and each candidate tag, a semantic matching model may be utilized to obtain the first correlation information when the first correlation information is obtained. Description will be made below in combination with FIG. 4. FIG. 4 is a flow chart illustrating a method for generating a tag of a video according to another embodiment of the present disclosure.

As illustrated in FIG. 4, the method for generating a tag of a video includes the followings.

At block 401, multiple candidate tags of the video are obtained.

At block 402, video information of the video is obtained.

In this embodiment, the actions at blocks 401-402 are similar to the actions at blocks 101-102, which is not elaborated herein.

At block 403, the video information and each of the multiple candidate tags are input into a semantic matching model to generate the first correlation information between the video information and each of the multiple candidate tags.

In an embodiment of the present disclosure, the semantic matching model may be trained in advance. For each candidate tag of the video, the candidate tag and the video information may be input into the semantic matching model, and the first correlation information between the candidate tag and the video information is obtained through the semantic matching model.

The first correlation information may be a matching score, which is used to represent a matching degree between a candidate tag and the video information. The higher the matching score, the greater the correlation is.

At block 404, the multiple candidate tags are sorted based on the first correlation information to obtain a sort result.

At block 405, the tag of the video is generated based on the sort result.

In this embodiment, the actions at blocks 404-405 are similar to the actions at blocks 103-104, which is not elaborated herein.

In some embodiments of the present disclosure, when the first correlation information between the video information and each of the multiple candidate tags is determined, the video information and each of the multiple candidate tags is input into the semantic matching model to generate the first correlation information between the video information and each of the multiple candidate tags. In this way, the first correlation information between each candidate tag and the video information is obtained by utilizing the semantic matching model, thereby improving the accuracy of the first correlation information. The tag of the video is generated based on the first correlation information, thereby improving the accuracy of the tag of the video.

Figure 5:
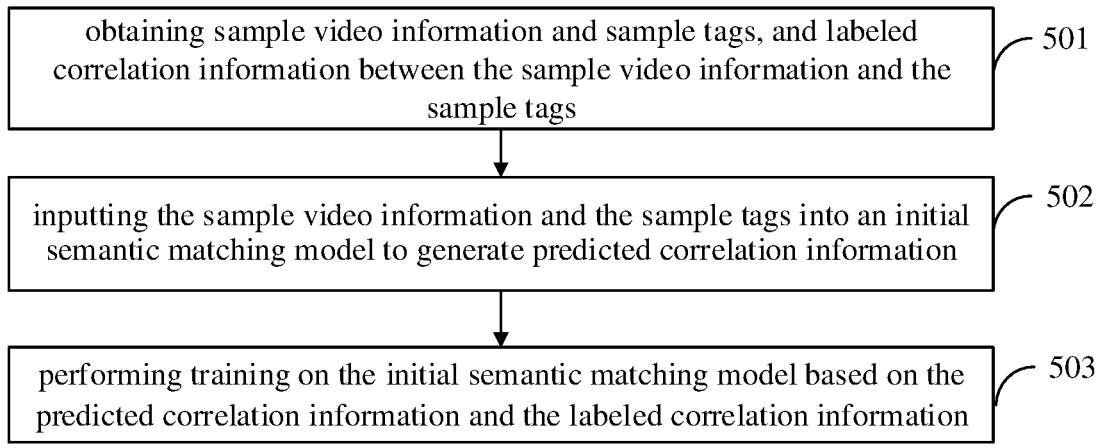
FIG. 5 is a flow chart illustrating a method for generating a tag of a video according to another embodiment of the present disclosure.

In some embodiments of the present disclosure, the semantic matching model may be trained by a method illustrated in FIG. 5. FIG. 5 is a flow chart illustrating a method for generating a tag of a video according to another embodiment of the present disclosure.

As illustrated in FIG. 5, the semantic matching model is obtained by means of the followings.

At block 501, sample video information, sample tags, and labeled correlation information between the sample video information and the sample tags are obtained.

In an embodiment of the present disclosure, a large number of sample videos may be obtained, and sample video information and a sample tag of each sample video may be obtained. A sample tag refers to a tag of a sample video. The sample tags may be manually labeled. A sample tag may be related or unrelated to the sample video information. One piece of sample video information may have multiple sample tags.

In addition, the labeled correlation information between the sample video information and the sample tags may also be obtained. When the sample video information is related to a sample tag, the labeled correlation information may be labeled as 1. When the sample video information is unrelated to a sample tag, the labeled correlation information may be labeled as 0.

At block 502, the sample video information and the sample tags are input into an initial semantic matching model to generate predicted correlation information.

In an embodiment of the present disclosure, for each piece of sample video information, the sample video information and each sample tag corresponding to the sample video information may be grouped and input into the initial semantic matching model. The initial semantic matching model generates corresponding predicted correlation information.

At block 503, training is performed on the initial semantic matching model based on the predicted correlation information and the labeled correlation information.

In an embodiment of the present disclosure, during performing model training, training is performed by means of deep learning.

After the predicted correlation information is obtained, a loss value may be determined based on the predicted correlation information and the labeled correlation information. It is determined whether the loss value is greater than a preset loss threshold. Parameter adjustment is performed on the initial semantic matching model when the loss value is greater than the preset loss threshold. Then, the sample video information and the sample tag are input into the semantic matching model subjected to the parameter adjustment to generate predicted correlation information. A loss value may be determined based on the predicted correlation information and the labeled correlation information. It is determined whether the loss value is greater than the preset loss threshold. The training is continuously performed as long as the loss value is greater than the preset loss threshold. The training is ended when the loss value is lower than the preset loss threshold.

In this embodiment, the sample video information, the sample tags, and the labeled correlation information between the sample video information and the sample tags are obtained, the sample video information and the sample tags are input into the initial semantic matching model to generate the predicted correlation information, and training is performed on the initial semantic matching model based on the predicted correlation information and the labeled correlation information. In this way, the semantic matching model may be obtained by training with the sample video information, the sample tags and the labeled correlation information, and the first correlation information with a high accuracy between the video information and a candidate tag may be obtained by utilizing the trained semantic matching model In an embodiment of the present disclosure, when the video information of the video is obtained, a title of the video, character information of a character in the video, and classification information of the video may be obtained, and then the video information is generated based on the title, the character information, and the classification information of the video.

The title of the video may be obtained directly. The character information in the video may be a text spliced with names of multiple characters. The text is generated based on the number of appearances of a face of each character. The larger the number of appearances of a certain character, the more the name of the character appears in the text. Obtaining the classification information of the video may refer to the above embodiments, which is not elaborated herein.

In this embodiment, the video information includes the title of the video, the character information of the character in the video and the classification information of the video. After the video information is obtained, the first correlation information between the video information and each candidate tag may be calculated, the multiple candidate tags may be sorted based on the first correlation information to obtain the sort result, and the tag of the video may be generated based on the sort result.

In some embodiments of the present disclosure, when obtaining the video information of the video, the title of the video, the character information of the character in the video, and the classification information of the video, the video information is generated based on the title, the character information, and the classification information of the video. In this way, the video information that represents the video content may be obtained based on the title, the character information, and the classification information of the video, thereby improving the accuracy of the first correlation information.

Figure 6:
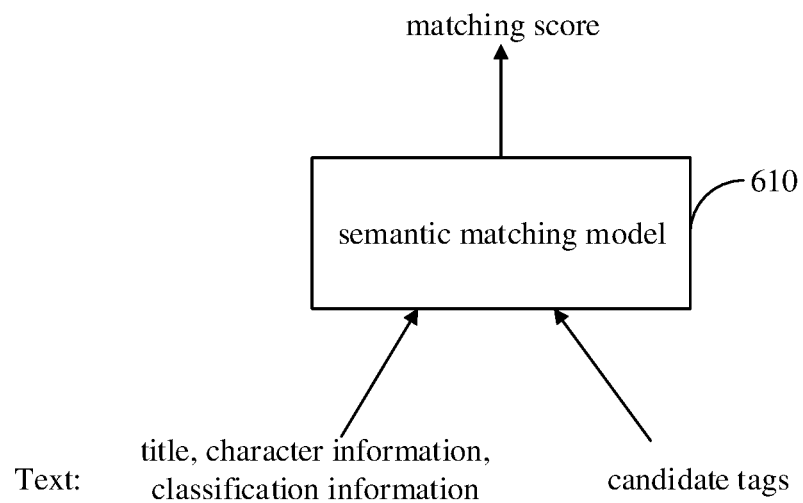
FIG. 6 is a schematic diagram illustrating obtaining a matching score by utilizing a semantic matching model according to embodiments of the present disclosure.

Description will be made below to obtaining the matching score between the video information and each of the multiple candidate tags by utilizing the semantic recognition model in combination with FIG. 6. FIG. 6 is a schematic diagram illustrating obtaining a matching score by utilizing a semantic matching model according to embodiments of the present disclosure.

In FIG. 6, multiple candidate tags and a text including the title, the character information and the classification information of the video are input into a semantic matching model 610, and the semantic matching model 610 outputs a matching score between the video information and each of the multiple candidate tags.

After the matching score between each candidate tag and the video information is obtained, the multiple candidate tags may be sorted based on the obtained matching scores, and a preset number of candidate tags with relatively high matching scores may be used as the tags of the video.

In an embodiment of the present disclosure, in order to further improve the accuracy of the tag of the video, tag granularity information of the multiple candidate tags of the video may also be obtained, and then the multiple candidate tags are sorted based on the first correlation information between each of the multiple candidate tags and the video information, and the tag granularity information of each candidate tag.

The tag granularity information is used to represent a range of a candidate tag. The finer a granularity, the smaller the range of the candidate tag is. For example, a granularity of "costume hermit teleplay" is obviously finer than a granularity of "costume teleplay".

In detail, for each candidate tag, length of the candidate tag is obtained based on the number of fields included in the candidate tag. Then the tag granularity information of each candidate tag is generated based on the length of each candidate tag. The longer the length of a candidate tag, the finer the granularity of the candidate tag is.

After the first correlation information between each candidate tag and the video information and the tag granularity information of each candidate tag are obtained, for each candidate tag, a weighted sum of the first correlation information and the tag granularity information may be calculated based on the first correlation information, the tag granularity information, a weight of the first correlation information and a weight of the tag granularity information, to obtain the score of the candidate tag. Then, the multiple candidate tags are sorted based on the score of each candidate tag, and the tag of the video is generated based on the sort result.

Alternatively, the multiple candidate tags may also be sorted based on the first correlation information and the tag granularity information respectively. A preset number of candidate tags with relatively high correlation and a preset number of candidate tags with relatively fine granularity are selected respectively. The tag of the video is generated based on the selected candidate tags.

In embodiments of the present disclosure, the length of each of the multiple candidate tags may also be obtained, the tag granularity information of each of the multiple candidate tags is generated based on the length of each of the multiple candidate tags, and the multiple candidate tags are sorted based on the first correlation information and the tag granularity information. In this way, the multiple candidate tags are sorted based on the correlation information between the video information and each of the multiple candidate tags, and the tag granularity information of each candidate tag, thereby improving the accuracy of sorting and the accuracy of the tag of the video.

In an embodiment of the present disclosure, heat information of the multiple candidate tags may also be obtained. The multiple candidate tags are sorted based on the first correlation information and the heat information.

In detail, the number of appearances of each candidate tag in articles, videos or the like may be counted, and the heat information may be obtained based on the number of appearances. The larger the number of appearances, the higher the heat is. When the heat of the candidate tag is high, the candidate tag is more likely to be the tag of the video, and effect of the video recommendation may be improved.

After the heat information of the multiple candidate tags and the first correlation information between the multiple candidate tags and the video information are obtained, for each candidate tag, a weighted sum of first correlation information and heat information may be calculated based on the first correlation information and the heat information corresponding to the candidate tag, a weight of the first correlation information and a weight of the heat information, to obtain the score of the candidate tag. Then, the multiple candidate tags are sorted based on the score of each candidate tag to obtain a sort result, and the tag of the video is generated based on the sort result.

Alternatively, the multiple candidate tags may be sorted based on the first correlation information and the heat information respectively. Then, a preset number of candidate tags with relatively high correlation and a preset number of candidate tags with relatively high heat are selected. The tag of the video is generated based on the selected candidate tags.

In embodiments of the present disclosure, the heat information of the multiple candidate tags may also be obtained, and the multiple candidate tags may be sorted based on the first correlation information and the heat information. In this way, the candidate tags are sorted by considering the correlation between the video information and the candidate tags, and the heat information of the candidate tags, thereby improving the accuracy of the sort result, and further improving the accuracy of the tag of the video.

It should be noted that, the tag granularity information and the heat information of the multiple candidate tags may also be obtained at the same time. A weighted sum of the first correlation information, the tag granularity information and the heat information of each candidate tag is determined based on the first correlation information, the tag granularity information and the heat information. The multiple candidate tags may be sorted based on the weighted sum corresponding to each candidate tag, thus improving the accuracy of the sort result and further improving the accuracy of the tag of the video.

Figure 7:
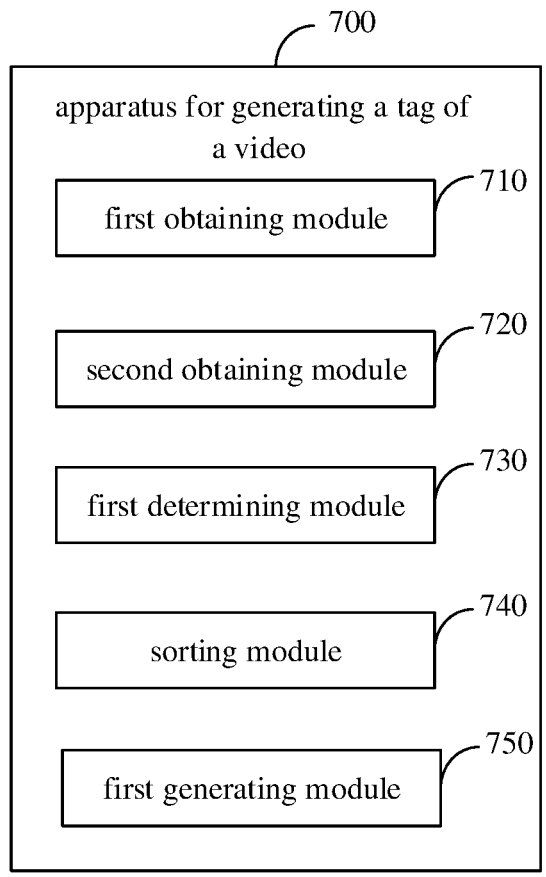
FIG. 7 is a block diagram illustrating an apparatus for generating a tag of a video according to embodiments of the present disclosure.

To achieve the above embodiments, embodiments of the present disclosure also provide an apparatus for generating a tag of a video. FIG. 7 is a block diagram illustrating an apparatus for generating a tag of a video according to embodiments of the present disclosure.

As illustrated in FIG. 7, the apparatus 700 for generating the tag of the video includes: a first obtaining module 710, a second obtaining module 720, a first determining module 730, a sorting module 740, and a first generating module 750.

The first obtaining module 710 is configured to obtain multiple candidate tags of the video.

The second obtaining module 720 is configured to obtain video information of the video.

The first determining module 730 is configured to calculate first correlation information between the video information and each of the multiple candidate tags.

The sorting module 740 is configured to sort the multiple candidate tags based on the first correlation information to obtain a sorted result.

The first generating module 750 is configured to generate the tag of the video based on the sorted result.

In a possible implementation of embodiments of the present disclosure, the apparatus may also include: a third obtaining module and a second determining module.

The third obtaining module is configured to obtain a knowledge map or a knowledge point map corresponding to the video.

The second determining module is configured to determine second correlation information between the multiple candidate tags based on the knowledge map or the knowledge point map. The sorting module is configured to sort the multiple candidate tags based on the first correlation information and the second correlation information.

In a possible implementation of embodiments of the present disclosure, the first obtaining module 710 is configured to: obtain a title of the video; and generate the multiple candidate tags based on the title.

In a possible implementation of embodiments of the present disclosure, the first obtaining module 710 is configured to: obtain an author tag of the video; and generate the multiple candidate tags based on the author tag.

In a possible implementation of embodiments of the present disclosure, the first obtaining module 710 is configured to: obtain classification information of the video; and generate the multiple candidate tags based on the classification information.

In a possible implementation of embodiments of the present disclosure, the first obtaining module 710 is configured to: recognize text information in the video; and generate the multiple candidate tags based on the text information.

In a possible implementation of embodiments of the present disclosure, the first obtaining module 710 is configured to: perform face recognition on a character in the video to obtain character information and a time length of appearance of the character; determine whether the character is a main character in the video based on the time length of appearance; and generate the multiple candidate tags based on the character information of the character in a case that the character is the main character.

In a possible implementation of embodiments of the present disclosure, the first determining module 730 is configured to: input the video information and each of the multiple candidate tags into a semantic matching model to generate the first correlation information between the video information and each of the multiple candidate tags.

In a possible implementation of embodiments of the present disclosure, the semantic matching model is obtained by: a fourth obtaining module, a second generating module, and a training module.

The fourth obtaining module is configured to obtain sample video information and sample tags, and labeled correlation information between the sample video information and the sample tags.

The second generating module is configured to input the sample video information and the sample tags into an initial semantic matching model to generate predicted correlation information.

The training module is configured to perform training on the initial semantic matching model based on the predicted correlation information and the labeled correlation information.

In a possible implementation of embodiments of the present disclosure, the second obtaining module 720 is configured to: obtain a title of the video; obtain character information of a character in the video obtain classification information of the video; and generate the video information based on the title, the character information, and the classification information of the video.

In a possible implementation of embodiments of the present disclosure, the apparatus may also include a fifth obtaining module and a third generating module.

The fifth obtaining module is configured to obtain length of each of the multiple candidate tags.

The third generating module is configured to generate tag granularity information of each of the multiple candidate tags based on the length of each of the multiple candidate tags. The sorting module is configured to sort the multiple candidate tags based on the first correlation information and the tag granularity information.

In a possible implementation of embodiments of the present disclosure, the apparatus may also include a sixth obtaining module. The sixth obtaining module is configured to obtain heat information of the multiple candidate tags.

The sorting module is configured to sort the multiple candidate tags based on the first correlation information and the heat information.

It should be noted that, the description for the above embodiments of the method for generating the tag of the video is also applicable to the apparatus for generating the tag of the video in this embodiment, which is not elaborated herein.

With the apparatus for generating the tag of the video according to embodiments of the present disclosure, the multiple candidate tags of the video and the video information of the video are obtained. The first correlation information between the video information and each of the multiple candidate tags is determined. Then, the multiple candidate tags are sorted based on the first correlation information to obtain the sort result, and the tag of the video is generated based on the sort result. In this way, the multiple candidate tags are sorted based on the correlation information between the video information and each candidate tag, and the tag of the video is generated based on the sort result, thereby implementing the integration and utilization for the multiple candidate tags, labeling the video accurately and perfectly, improving the accuracy and the integrity of the tag of the video, and improving the effect of the video recommendation.

According to embodiments of the present disclosure, the present disclosure also provides an electronic device and a readable storage medium.

Figure 8:
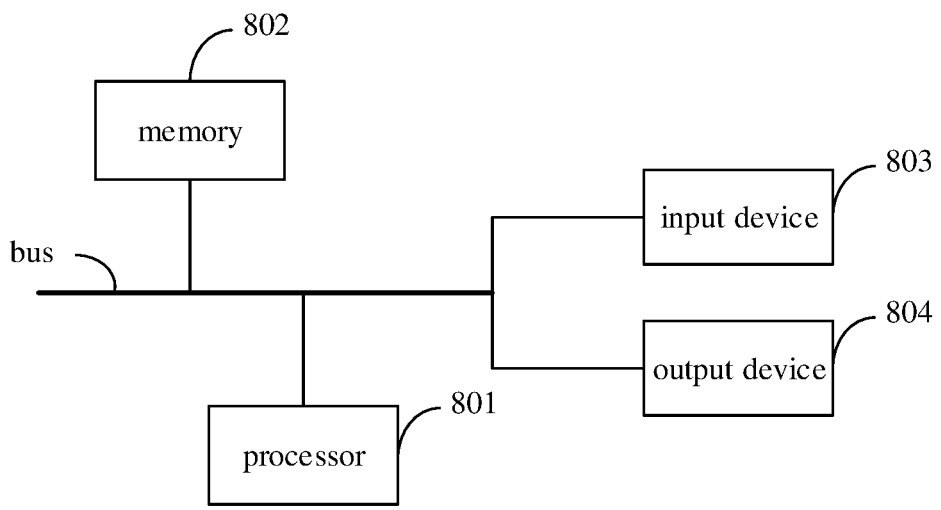
FIG. 8 is a block diagram illustrating an electronic device capable of implementing a method for generating a tag of a video according to embodiments of the present disclosure.

As illustrated in FIG. 8, FIG. 8 is a block diagram illustrating an electronic device capable of implementing a method for generating a tag of a video according to embodiments of the present disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the present disclosure described and/or claimed herein.

As illustrated in FIG. 8, the electronic device includes: one or more processors 801, a memory 802, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 8, a processor 801 is taken as an example.

The memory 802 is a non-transitory computer readable storage medium provided by the present disclosure. The memory is configured to store instructions executable by at least one processor, to enable the at least one processor to execute a method for generating a tag of a video method provided by the present disclosure. The non-transitory computer readable storage medium provided by the present disclosure is configured to store computer instructions. The computer instructions are configured to enable a computer to execute the method for generating the tag of the video provided by the present disclosure.

As the non-transitory computer readable storage medium, the memory 802 may be configured to store non-transitory software programs, non-transitory computer executable programs and modules, such as program instructions/module (such as the first obtaining module 710, the second obtaining module 720, the first determining module 730, the sorting module 740, and the first generating module 750 illustrated in FIG. 7) corresponding to the method for generating the tag of the video according to embodiments of the present disclosure. The processor 801 is configured to execute various functional applications and data processing of the server by operating non-transitory software programs, instructions and modules stored in the memory 802, that is, implements the method for generating the tag of the video according to the above method embodiments.

The memory 802 may include a storage program region and a storage data region. The storage program region may store an application required by an operating system and at least one function. The storage data region may store data created according to predicted usage of the electronic device based on the semantic representation. In addition, the memory 802 may include a high-speed random access memory, and may also include a non-transitory memory, such as at least one disk memory device, a flash memory device, or other non-transitory solid-state memory device. In some embodiments, the memory 802 may optionally include memories remotely located to the processor 801, and these remote memories may be connected to the electronic device via a network. Examples of the above network include, but are not limited to, an Internet, an intranet, a local area network, a mobile communication network and combinations thereof.

The electronic device capable of implementing the method for generating the tag of the video may also include: an input device 803 and an output device 804. The processor 801, the memory 802, the input device 803, and the output device 804 may be connected via a bus or in other means. In FIG. 8, the bus is taken as an example.

The input device 803 may receive inputted digital or character information, and generate key signal input related to user setting and function control of the electronic device capable of implementing the method for generating the tag of the video, such as a touch screen, a keypad, a mouse, a track pad, a touch pad, an indicator stick, one or more mouse buttons, a trackball, a joystick and other input device. The output device 804 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other.

With the technical solution of embodiments of the present disclosure, the correlation information between the video information and each candidate tag is determined. Then, the multiple candidate tags are sorted based on the correlation information to obtain the sort result. The tag of the video is generated based on the sort result. In this way, the integration and utilization for the multiple candidate tags are implemented, the video is labeled accurately and perfectly, the accuracy and the integrity of the tag of the video are improved, and the effect of the video recommendation is improved.

In the description for the present disclosure, the terms "first" and "second" are only for description purpose, and cannot be understood as indicating or implying relative importance or implicitly indicating the number of indicated technical features. Therefore, the features defined with "first" and "second" can include at least one of the features explicitly or implicitly. In the description of the present disclosure, the term "multiple" means two or more, such as two and three, unless specified otherwise.

Although the embodiments of the present disclosure have been illustrated and described above, it can be understood that the above embodiments are exemplary and should not be construed as limiting the present disclosure. The skilled in the art can make changes, modifications, substitutions and variations to the above embodiments within the scope of the present disclosure.

What is claimed is:

1. A method for generating a tag of a video, comprising:
    obtaining a plurality of candidate tags of the video;
    obtaining video information of the video;
    determining first correlation information between the video information and each of the plurality of candidate tags;
    sorting the plurality of candidate tags based on the first correlation information to obtain a sort result; and
    generating the tag of the video based on the sort result.

2. The method of claim 1, further comprising:
    obtaining a knowledge map or a knowledge point map corresponding to the video; and
    determining second correlation information between the plurality of candidate tags based on the knowledge map or the knowledge point map, wherein the plurality of candidate tags are sorted based on the first correlation information and the second correlation information.

3. The method of claim 1, wherein obtaining the plurality of candidate tags of the video comprises at least one of:
    obtaining a title of the video, and generating the plurality of candidate tags based on the title;
    obtaining an author tag of the video, and generating the plurality of candidate tags based on the author tag;
    obtaining classification information of the video, and generating the plurality of candidate tags based on the classification information;
    recognizing text information in the video, and generating the plurality of candidate tags based on the text information; and
    performing face recognition on a character in the video to obtain character information and a time length of appearance of the character, determining whether the character is a main character in the video based on the time length of appearance, and generating the plurality of candidate tags based on the character information of the character in a case that the character is the main character.

4. The method of claim 1, wherein determining the first correlation information between the video information and each of the plurality of candidate tags comprises:
    inputting the video information and each of the plurality of candidate tags into a semantic matching model to generate the first correlation information between the video information and each of the plurality of candidate tags.

5. The method of claim 4, wherein the semantic matching model is obtained by:

obtaining sample video information, sample tags, and labeled correlation information between the sample video information and the sample tags;
inputting the sample video information and the sample tags into an initial semantic matching model to generate predicted correlation information; and
performing training on the initial semantic matching model based on the predicted correlation information and the labeled correlation information.

6. The method of claim 1, wherein obtaining the video information of the video comprises:
    obtaining a title of the video;
    obtaining character information of a character in the video
    obtaining classification information of the video; and
    generating the video information based on the title, the character information, and the classification information of the video.

7. The method of claim 1, further comprising:
    obtaining length of each of the plurality of candidate tags; and
    generating tag granularity information of each of the plurality of candidate tags based on the length of each of the plurality of candidate tags, wherein the plurality of candidate tags are sorted based on the first correlation information and the tag granularity information.

8. The method of claim 1, further comprising:
    obtaining heat information of the plurality of candidate tags, wherein the plurality of candidate tags are sorted based on the first correlation information and the heat information.

9. An electronic device, comprising:
    at least one processor; and
    a memory, communicatively coupled to the at least one processor,
    wherein the memory is configured to store instructions executable by the at least one processor that, when executed by the at least one processor, causing the at least one processor to implement a method for generating a tag of a video, the method comprising:
    obtaining a plurality of candidate tags of the video;
    obtaining video information of the video;
    determining first correlation information between the video information and each of the plurality of candidate tags;
    sorting the plurality of candidate tags based on the first correlation information to obtain a sort result; and
    generating the tag of the video based on the sort result.

10. The electronic device of claim 9, wherein the method further comprises:
    obtaining a knowledge map or a knowledge point map corresponding to the video; and
    determining second correlation information between the plurality of candidate tags based on the knowledge map or the knowledge point map, wherein the plurality of candidate tags are sorted based on the first correlation information and the second correlation information.

11. The electronic device of claim 9, wherein obtaining the plurality of candidate tags of the video comprises at least one of:
    obtaining a title of the video, and generating the plurality of candidate tags based on the title;
    obtaining an author tag of the video, and generating the plurality of candidate tags based on the author tag;
    obtaining classification information of the video, and generating the plurality of candidate tags based on the classification information;

recognizing text information in the video, and generating the plurality of candidate tags based on the text information; and performing face recognition on a character in the video to obtain character information and a time length of appearance of the character, determining whether the character is a main character in the video based on the time length of appearance, and generating the plurality of candidate tags based on the character information of the character in a case that the character is the main character.

12. The electronic device of claim 9, wherein determining the first correlation information between the video information and each of the plurality of candidate tags comprises:

inputting the video information and each of the plurality of candidate tags into a semantic matching model to generate the first correlation information between the video information and each of the plurality of candidate tags.

13. The electronic device of claim 12, wherein the semantic matching model is obtained by:

obtaining sample video information, sample tags, and labeled correlation information between the sample video information and the sample tags;

inputting the sample video information and the sample tags into an initial semantic matching model to generate predicted correlation information; and performing training on the initial semantic matching model based on the predicted correlation information and the labeled correlation information.

14. The electronic device of claim 9, wherein obtaining the video information of the video comprises:

obtaining a title of the video;
obtaining character information of a character in the video
obtaining classification information of the video; and
generating the video information based on the title, the character information, and the classification information of the video.

15. The electronic device of claim 9, further comprising:
obtaining length of each of the plurality of candidate tags; and generating tag granularity information of each of the plurality of candidate tags based on the length of each of the plurality of candidate tags, wherein the plurality of candidate tags are sorted based on the first correlation information and the tag granularity information.

16. The electronic device of claim 9, further comprising:
obtaining heat information of the plurality of candidate tags, wherein the plurality of candidate tags are sorted based on the first correlation information and the heat information.

17. A non-transitory computer readable storage medium having computer instructions stored thereon, wherein the computer instructions are configured to cause a computer to execute a method for generating a tag of a video, the method comprising:

obtaining a plurality of candidate tags of the video;
obtaining video information of the video;
determining first correlation information between the video information and each of the plurality of candidate tags;
sorting the plurality of candidate tags based on the first correlation information to obtain a sort result; and
generating the tag of the video based on the sort result.

18. The storage medium of claim 17, wherein the method further comprises:

obtaining a knowledge map or a knowledge point map corresponding to the video; and determining second correlation information between the plurality of candidate tags based on the knowledge map or the knowledge point map, wherein the plurality of candidate tags are sorted based on the first correlation information and the second correlation information.

19. The storage medium of claim 17, wherein obtaining the plurality of candidate tags of the video comprises at least one of:

obtaining a title of the video, and generating the plurality of candidate tags based on the title;

obtaining an author tag of the video, and generating the plurality of candidate tags based on the author tag;

obtaining classification information of the video, and generating the plurality of candidate tags based on the classification information;

recognizing text information in the video, and generating the plurality of candidate tags based on the text information; and performing face recognition on a character in the video to obtain character information and a time length of appearance of the character, determining whether the character is a main character in the video based on the time length of appearance, and generating the plurality of candidate tags based on the character information of the character in a case that the character is the main character.

20. The storage medium of claim 17, wherein determining the first correlation information between the video information and each of the plurality of candidate tags comprises:

inputting the video information and each of the plurality of candidate tags into a semantic matching model to generate the first correlation information between the video information and each of the plurality of candidate tags.

* * * * *